UNITED STATES PATENT OFFICE 2,155,949

LURE FOR COMBATING RODENTS

Hans Maier-Bode, Karl Brodersen, and Hermann Behncke, Dessau in Anhalt, Germany, assignors to Winthrop Chemical Company, Inc., New York, N. Y., a corporation of New York No Drawing. Application May 7, 1936, Serial No. 78,404. In Germany May 8, 1935

4 Claims. (Cl. 167—48)

Our present invention relates to products useful for extirpating rodents, such as mice, rats, hamsters, rabbits and so on, and is based on the observation that halogen derivatives of polyhydric alcohols are especially useful for the purpose set forth.

These compounds which are indicated in the examples following hereafter correspond to the general formula

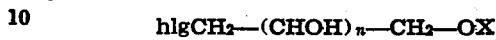

wherein hlg means halogen, $n$ is 0 and 1 and X stands for H, hydroxyalkyl, halogenoalkyl, halogenohydroxyalkyl.

When compared with known products recommended for combating rodents, the said halogen derivatives have the advantage to have no repellent taste as, for instance, strychnine or theobromine, but to have, on the contrary, generally a sweet taste. Preferably, they are used by poisoning the food of the rodents.

The following examples serve to illustrate our invention, the parts being by weight:

*Example 1.*—95 parts of small pieces of baker's wares are mixed with 5 parts of glycerine monochlorhydrine. After addition of some water, small cakes are formed of the mixture. The cakes are willingly eaten by mice and certainly kill them in a short time. Thus, for instance, mice died after having eaten 20 milligrams of the poison.

*Example 2.*—Grains of wheat are impregnated with an aqueous solution of glycerine monochlorhydrine of 10 per cent strength. 3 to 4 grains are sufficient to kill the mice.

*Example 3.*—A preparation prepared from glycerine monobromhydrine made as indicated in Example 2, acts in the same manner.

*Example 4.*—When using in the preparation described in Example 1 instead of glycerine monochlorhydrine the corresponding iodine compound, a lure is obtained from which a quantity corresponding to 20 milligrams of the poison suffices to kill mice.

*Example 5.*—A rabbit that willingly ate 15 grams of wheat impregnated with an aqueous solution of glycerine monochlorhydrine of 10 per cent. strength, was dead in a short time.

*Example 6.*—Wheat impregnated with 5 per cent of $\beta$-chlor-$\beta'$-hydroxydiethylether is willingly eaten by mice. An animal ate 5 grains and was dead in a short time.

*Example 7.*—By impregnating grain with 5 per cent. of its weight of $\gamma \cdot \gamma'$-dichlor-$\beta \cdot \beta'$-dihydroxydipropyl ether a preparation is obtained which likewise is very effective for combating mice.

*Example 8.*—Small pieces of baker's wares are mixed with 5 per cent. of their weight of $\beta$-chlorethyl-$\gamma'$-chlor-$\beta'$-hydroxypropyl ether. The mass is moistened with water and small cakes are formed which are very effective for combating rodents. Mice die in a short time after having eaten 300 milligrams, that means, 15 milligrams of the poison.

What we claim is:

1. Lures for combating rodents containing a solid water-insoluble starch-containing food and a halogenated compound of the general formula

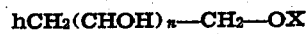

wherein h means halogen, $n$ is 0 or 1 and X stands for a member of the group consisting of hydrogen, hydroxyalkyl, halogenoalkyl, halogenohydroxyalkyl.

2. Lures for combating rodents containing a solid water-insoluble starch-containing food and a halogenated compound of the general formula

wherein h means halogen and X stands for a member of the group consisting of hydrogen, hydroxyalkyl, halogenoalkyl, halogenohydroxyalkyl.

3. Lures for combating rodents containing a solid water-insoluble starch-containing food and a glycerine monohalogenohydrine.

4. Lures for combating rodents containing a solid water-insoluble starch-containing food and a glycerine monochlorhydrine.

HANS MAIER-BODE.
KARL BRODERSEN.
HERMANN BEHNCKE.